Apr. 10, 1923. Re. 15,575
C. A. GEDDES
CARBONATOR AND DRAFT ARM FOR SODA WATER
Original Filed Sept. 20, 1920 2 sheets-sheet 1
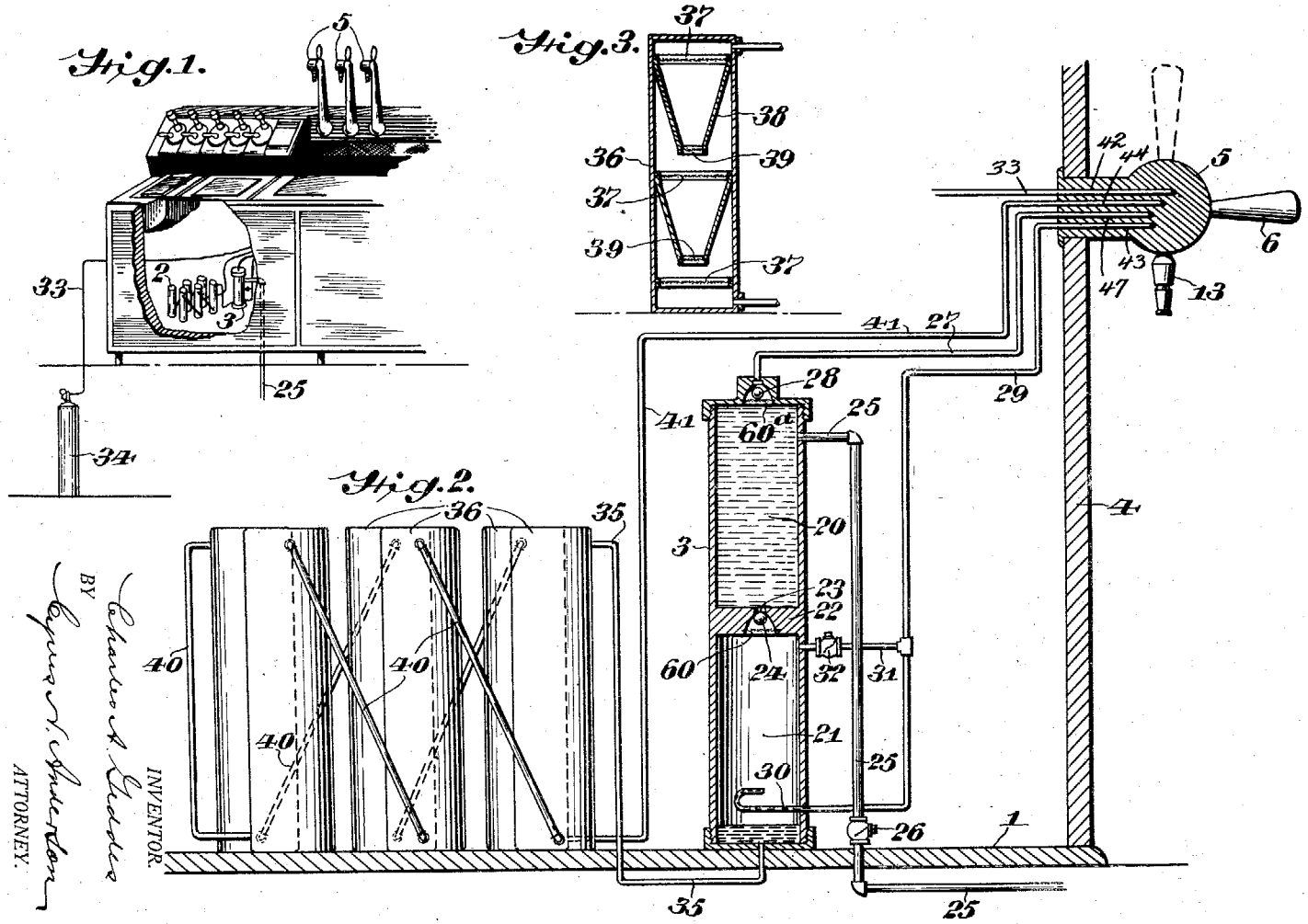
INVENTOR.
Charles A. Geddes
BY
Cyrus N. Anderson
ATTORNEY.

Apr. 10, 1923. Re. 15,575
C. A. GEDDES
CARBONATOR AND DRAFT ARM FOR SODA WATER
Original Filed Sept. 20, 1920 2 sheets-sheet 2
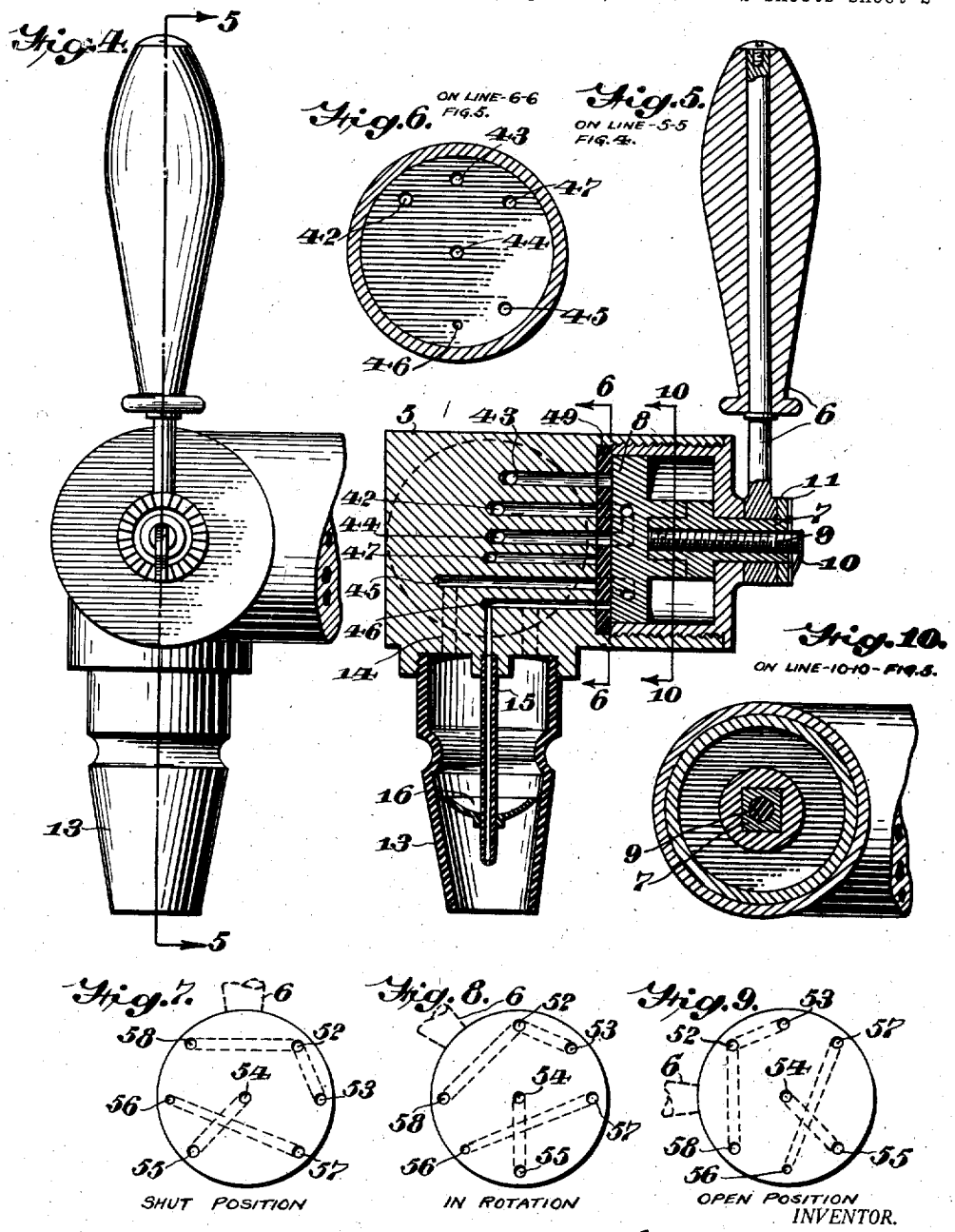
INVENTOR.
Charles A. Geddes
BY
Cyprus N. Anderson
ATTORNEY.

Reissued Apr. 10, 1923. Re. 15,575

UNITED STATES PATENT OFFICE.

CHARLES A. GEDDES, OF PHILADELPHIA, PENNSYLVANIA, ASSIGNOR TO NATIONAL CARBONATOR MANUFACTURING COMPANY, INCORPORATED, A CORPORATION OF DELAWARE.

CARBONATOR AND DRAFT ARM FOR SODA WATER.

Original No. 1,397,929, dated November 22, 1921, Serial No. 411,516, filed September 20, 1920. Application for reissue filed May 24, 1922. Serial No. 563,370.

*To all whom it may concern:*

Be it known that I, CHARLES A. GEDDES, a citizen of the United States, and a resident of Philadelphia, in the county of Philadelphia, State of Pennsylvania, have invented certain new and useful Improvements in Carbonators and Draft Arms for Soda Water, of which the following is a specification.

This invention relates to dispensing apparatus such as is used in soda-water fountains and consists more particularly in certain improvements I have made in the means for carbonating the water and dispensing the charged liquid.

One of the objects of the invention is to control the carbonating solely by the movements of a single draft arm or dispensing handle whereby the amount of liquid and gas delivered to the charging chamber is governed by the amount of carbonated liquid withdrawn from the said chamber.

Other objects and advantages will appear in the course of the following description in which reference is made to the accompanying drawing in which:

Fig. 1 is a perspective view, partly broken away, of a dispensing apparatus or soda fountaian equipped with improvements embodying my invention;

Fig. 2 is an enlarged view partly in section and partly in elevation showing the arrangement of parts constituting my invention, the passageways or ports in the valve casing being shown in displaced or distorted position for convenience of illustration;

Fig. 3 is a vertical sectional view of one of the secondary absorption or charging chambers shown in Fig. 2;

Fig. 4 is a view in front elevation of the dispensing faucet and operating arm or handle;

Fig. 5 is a vertical sectional view taken on the line 5—5 of Fig. 4, the passageways within the valve casing of the faucet being shown in displaced or distorted position for convenience of illustration;

Fig. 6 is a view in cross section taken on the line 6—6 of Fig. 5 showing the arrangement of the ports in the valve seat of the faucet;

Figs. 7, 8 and 9 are diagrams showing the positions of the ports in the valve in its different positions; and Fig. 10 is a view in cross section taken on the line 10—10 of Fig. 5.

Similar reference numerals indicate corresponding parts throughout the drawings.

Referring to the drawings: 1 designates a base upon which the various parts of the apparatus are supported. 3 designates a tubular member supported upon said base, and 4 a standard upon which is supported the valve casing 5 of the faucet. 6 designates the handle or draft arm, which is mounted on the outer end of a square shaft 7, the inner end of which is connected with the rotatable valve 8. The said valve is slidable on the inner end of said shaft so that it may be pressed against its seat by a screw 9 provided with means, such as a spring arm 10 engaging serrations formed on a washer or head 11 carried by the shaft 7, to secure or hold it in adjusted position.

13 is the discharge tube of the faucet into which open the outlet passages 14 in the valve casing (see dotted lines in Fig. 5) and depending in which is the gas vent tube 15, carrying the cup 16 and communicating with the vent port in the valve casing hereinafter described. The member 3 is divided into upper and lower chambers 20 and 21 by means of a partition 22 through which is an opening or passageway 23 which is adapted to be closed upwardly by a ball check valve 24 which is adapted to be retained in operative relation to the opening 23 by the screen support 60. Water or other liquid is adapted to be supplied to the chamber 20 through a supply pipe 25, which pipe is provided with a downwardly closing check valve, the casing of which is shown at 26. By means of a pipe 27 leading from the valve casing of the faucet to an opening in the upper end of the chamber 20 gas is adapted to be supplied under pressure to said chamber to drive or force the water therefrom through the opening or passageway 23 into the chamber 21. The opening in the upper end of the chamber 20 through which gas is adapted to be supplied thereto is adapted to be closed by an upwardly closing check valve 28. The pipe 27 also serves the function of conveying gas from the chamber 20, when the latter is being filled with water or other liquid from the pipe 25, through the valve casing 5 and valve 8 to the vent tube 15 from which it is discharged, the ball check valve 28, at such time, dropping down upon the screen support 60[a] provided therefor. The valve 8 at such time is in open position because the pressure of the gas in the chamber 20 is not sufficient to raise the same. 29 is another gas supply pipe leading from the valve casing 5 of the faucet into the lower chamber 21 of the tubular member 3 in which chamber gas is absorbed by the liquid which is introduced thereinto from the chamber 20. Such chamber, 21, therefore, may be regarded and designated as the primary absorption chamber of the apparatus. The end of the gas supply pipe 29 within the chamber 21 is bent and perforated as shown at 30 in Fig. 2. 31 is a branch pipe leading from the pipe 29 into the top of the lower chamber 21 which branch pipe is provided with an outwardly closing check valve, the casing of which is indicated at 32. Gas may enter the upper portion of the chamber 21 from the pipe 29 through the pipe 31. The outwardly closing valve indicated at 32 prevents outflow of any gas which may happen to be in the chamber 21 above the top surface of any liquid which may also be present therein.

33 designates a gas supply pipe leading from a gas tank 34 (see Fig. 1) into the valve casing 5 of the faucet, and 35 designates a pipe which leads from the bottom of the absorption chamber 21 to the first of a number of secondary absorption chambers; 36, six of which are shown in the drawings; but it will be understood that the number may be varied as desired.

These secondary absorption chambers contain a plurality of screens, such as shown at 37 in Fig. 3, and one or all of them may also contain inverted truncated cones 38 closed at their lower ends by screens 39 to assist in the mixing of the gas and liquid, such as water; that is, in the charging of the liquid. These secondary absorption chambers are connected in series by the pipes 40 running from the bottom of each of them to the top of the next succeeding one, as shown in Fig. 2, and from the last of the series a pipe 41 extends to the valve casing.

As already indicated, the initial or first mixing of the gas and the liquid takes place in the first or primary absorption chamber 21 in which initial absorption is effected, and for the purpose of effecting a more intimate association of the gas with and a more complete absorption thereof by the liquid, the secondary absorption chambers 36 are provided, the number of which may be varied, as above stated.

The valve casing 5 contains the passages or ports 42, 43, 44, 45, 46, and 47, and the valve 8 contains the passages or ports 52, 53, 54, 55, 56, 57 and 58.

49 is the usual fixed washer between the valve 8 and its seat in the valve casing 5.

The gas supply pipe 33 communicates with the port or passage 42 in the valve seat which when the valve is in open position registers with the port 52 in the valve which is connected with the port 53 in the latter, and the port 53 registers at such time with the port 43 of the casing which leads to the pipe 29. Thus it will be seen that when the valve 8 is in open position a continuous passageway is afforded for the gas from the tank 34 to the absorption chamber 21. When the valve is in open position as just described the charged liquid in the pipe 41, which leads to the port or passage 44 in the valve casing, passes out through the port 54 in the valve and through a passage therein to the port 55, which registers with the port 45 in the casing which leads to the discharge outlets 14 which open into the discharge tube 13. Also when the valve is in open position the port 46 in the casing which leads from the vent tube 15 registers with the port 56 in the valve, which port is connected by a passage through the valve with the port 57 in the latter which registers with the port 47 in the seat. The port 47 leads to the pipe 27 which is connected with the chamber 20 whereby any gas which may have accumulated or which may be present in the latter may escape therefrom and be discharged through the vent tube 15. The opening of said passageway permits the gas within the chamber 20 to expand and flow out through the pipe 27 and vent tube 15 thereby relieving the pressure within said chamber 20 and permitting liquid to flow freely into said chamber from the pipe 25.

When the valve 8 is in closed or shut position, as shown in Figs. 5 and 7, the passageway through the valve leading to the pipe 29 is closed so that no gas can at such time be delivered to the chamber 21. At such time the port 42 in the valve seat, with which the gas outlet 33 communicates, registers with the port 58 in the valve disk 8, which port is connected by a passageway with the port 52 also in the valve disk, which communicates with the port 47 in the valve seat and then through the pipe 27 to the upper end of the chamber 20 and forces the liquid which may have entered said chamber during the period when the valve 8 was in open position through the check valve controlled opening or passageway 23 into the absorption chamber 21. When the valve is in this shut position all other ports or passageways in both the valve seat and the valve disk are closed.

The operation of the apparatus may be recapitulated briefly as follows: When the valve is opened gas is admitted into the lower chamber 21 wherein it is mingled with the liquid previously discharged into said chamber through the opening or passageway 23 from the liquid-receiving chamber 20. The said gas is discharged into the body of said liquid. In the said chamber 21 initial and partial absorption takes place. The liquid is forced by the pressure of the gas from the said chamber 21 through the pipe 35 into the first of the secondary absorption chambers 36 wherein the charging is completed and the gas thoroughly intermingled with and charged into the liquid and absorbed thereby. At the same time the gas from the upper chamber is vented through the pipe 27 to the vent tube 15 from which it is discharged and is permitted to intermingle and mix with the charged liquid which is being drawn from the faucet through the discharge tube 13. Simultaneously liquid, such as water, is being delivered through the supply pipe 25 into the liquid-receiving chamber 20. Immediately upon the closing of the valve by means of the handle or draft arm 6 all of the passages through the valve structure are closed with the exception of those passages leading from the gas supply pipe 33 through the valve casing 5 and valve 8 to the pipe 27 so that during the period or time when the valve is in closed or shut position the liquid is forced from the chamber 20 into the absorption chamber 21. It will be seen that during the time that the valve 8 is in shut position the gas supply tank is in communication with the liquid-receiving chamber 20 and through the opening or passageway 23 with the absorption chamber 21 and exerts pressure upon the liquid therein so that a certain amount of absorption takes place, but such pressure cannot effect flow of the liquid from the said chamber at such time or during such period because the outlet from the absorption chambers is closed thus preventing the passage or flow of liquid through the absorption chambers.

It will be seen that the valve structure constitutes a controlling means intermediate the gas supply and the chambers 20 and 21 and that by the operation of the single valve member 8 to open and close the same I am enabled by my invention to control the delivery of liquid and gas to the absorption chamber and also to control the delivery of charged liquid from the absorption chamber or chambers. It will be understood that when the absorption chamber or chambers is or are once filled with charged liquid the amount of uncharged liquid which may be delivered to the said chamber or chambers is dependent upon the amount of charged liquid which may be withdrawn therefrom.

It will now be apparent that I have devised a novel apparatus for carbonating and dispensing liquids, such as soda-water, which embodies the features of advantage enumerated as desirable in the statement of invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a dispensing apparatus, the combination of one or more secondary absorption chambers, a tubular member divided into upper and lower chambers, the latter of which constitutes a primary absorption chamber, a check valve between said chambers, a gas pipe leading into the upper chamber, a gas supply pipe leading into the lower chamber, a pipe connecting said lower chamber to said secondary absorption chamber or chambers, a water supply pipe leading into said upper chamber, and a valve controlling both the admission of gas to said upper and lower chambers and the discharge of carbonated water from said secondary absorption chamber or chambers.

2. In a dispensing apparatus, the combination of a secondary absorption chamber, a tubular member divided into upper and lower chambers, a check valve between said upper and lower chambers, a gas supply and vent pipe leading into the top of said upper chamber, a branched gas supply pipe leading into the top and bottom of said lower chamber, a pipe connecting the bottom of said lower chamber to said secondary absorption chamber, a water supply pipe leading into said upper chamber, and a valve controlling both the supply of gas to said upper and lower chambers and the discharge of carbonated water from said secondary absorption chamber.

3. In a dispensing apparatus, the combination of a plurality of absorption chambers connected in series, a chamber for receiving water, a passageway between said water receiving chamber and the first of said absorption chambers, a check valve in said passageway between said chambers, a pipe leading into the top of said water receiving chamber through which gas is supplied and withdrawn from said chamber, means to supply water to the latter, a gas supply pipe leading into the first of said absorption chambers, and a discharge pipe leading from the last absorption chamber, and means for controlling the flow in all of said chambers.

4. In apparatus for carbonating and dispensing liquids, the combination of a liquid-receiving chamber, an absorption chamber into which liquid is adapted to be delivered from said receiving chamber, means for supplying gas under pressure, controlling means, communicating means between the means for supplying gas and the said controlling means through which gas is supplied to the latter, communicating means between said controlling means and said receiving chamber through which gas is adapted to flow to and from the latter, communicating means between the said controlling means and the said absorption chamber through which gas is supplied to the latter, communicating means between the said absorption chamber and the said controlling means through which charged liquid is delivered from the former to the latter, the said controlling means comprising a member which, when in one position, opens a passageway through said controlling means to permit the passage of gas from the said gas supply means to the said absorption chamber and which simultaneously opens passageways through said controlling means to permit the passage of gas from the said liquid-receiving chamber and to permit the passage of charged liquid from the said absorption chamber, and when in another position closes the passageways last mentioned and opens a passageway to permit gas under pressure to flow from the said gas supply means to the said liquid-receiving chamber to force liquid therefrom into the absorption chamber.

5. In apparatus for carbonating and dispensing liquids, the combination of a liquid-receiving chamber, an absorption chamber, means for supplying gas under pressure, and a single valve member intermediate said means and said chambers for controlling the passage of gas to the said chambers and also for controlling and effecting the delivery of liquid from the liquid-receiving chamber to the absorption chamber and of the charged liquid from said absorption chamber.

6. In an apparatus for carbonating and dispensing liquids, the combination of a liquid-receiving chamber to which liquid is adapted to be supplied, an absorption chamber into which said liquid is adapted to be discharged through a passageway from said liquid-receiving chamber, means for controlling the passageway between said chambers, means for supplying carbonic acid gas under pressure, a controller, and tubular connections between said controller and the said means for supplying gas under pressure and also between said controller and the said chambers, the said controller comprising means for controlling the passage of gas to the said absorption chamber, and also to and from the said liquid-receiving chamber, and for controlling the flow of charged liquid from the said absorption chamber to the said controller.

7. In an apparatus for carbonating and dispensing liquids, the combination of a liquid-receiving chamber to which a liquid is adapted to be supplied, an absorption chamber into which liquid is adapted to be delivered through a passageway from the said liquid-receiving chamber, means for supplying carbonic acid gas under pressure, controlling means intermediate said means and the said chambers, means providing a plurality of connecting passageways between said controlling means and the said absorption chamber, and means providing a single passageway between the said receiving chamber and the said controlling means, the said controlling means comprising a member which is adapted to simultaneously open both of the passageways between said controlling means and the said absorption chamber through one of which gas under pressure is delivered to the absorption chamber and through the other of which charged liquid is drawn from the said absorption chamber and delivered through the said controlling means, and the said member simultaneously opening the passageway from the liquid-receiving chamber to permit the passage of gas from the latter and the said member also being adapted, when in another position, to close the first two of said passageways and to place the other passageway in communication with the gas supply means to permit gas to enter the liquid-receiving chamber from the said gas supply means.

8. In apparatus for carbonating and dispensing liquids, the combination of a liquid-receiving chamber into which liquid is adapted to be delivered from a source of supply, an absorption chamber into which liquid is adapted to be discharged through a passageway from the said liquid-receiving chamber, means for supplying gas under pressure, a valve casing, means providing connecting passageways between said valve casing and the means for supplying gas and the said chambers, and a valve within said casing which, when in open position, permits the flow of gas into said absorption chamber, the flow of liquid into said receiving chamber, the flow of gas from said receiving chamber, and the flow of charged liquid from the said absorption chamber, the said last mentioned flow being caused by the pressure of the gas within the absorption chamber.

9. In apparatus for carbonating and dispensing liquids, the combination of a liquid-receiving chamber into which water is adapted to be delivered from a source of supply under pressure, a primary absorption chamber into which water is adapted to be discharged through a passageway from the said liquid-receiving chamber, means for controlling said passageway, one or more secondary absorption chambers, means providing a communicating passageway between the primary and secondary absorption chambers, means for supplying carbonic acid gas under pressure to the liquid-receiving chamber and to the primary absorption chamber, a controller intermediate said gas supplying means and the said chambers, means providing a passageway between said controller and the said liquid-receiving chamber, means providing a passageway leading directly from the said controlling means to the primary absorption chamber, and means providing a passageway leading directly between said controlling means and the secondary absorption chamber or chambers, the said controlling means comprising a member which is adapted to control the passage of liquid and gas through the said absorption chambers and which is also adapted to control the passage of gas to and from the said receiving chamber.

10. In apparatus for carbonating and dispensing liquids, the combination of a liquid-receiving chamber to which a liquid is adapted to be supplied, an absorption chamber, a source of gas supply, a controller, a connection between said source and the said controller having a passageway through which gas is supplied, and connections between the said controller and the said chambers having passageways for the passage of gas, the said controller being provided with means which is adapted to control the passage of gas from the first mentioned passageway through the last mentioned passageways and which also is adapted to control the discharge of charged liquid from the said absorption chamber through the said controlling means.

11. In apparatus for carbonating and dispensing liquids, the combination of an absorption chamber, means for supplying liquid to said chamber, a controller, a source of gas supply, a conduit leading from said source to said controller, a conduit leading from said controller to said absorption chamber, a conduit leading from said absorption chamber to said controller, the said controller comprising means which when in one position permits the passage of gas directly from the said source to the said absorption chamber and simultaneously permits the outflow of charged liquid from said chamber, the admission of gas to said chamber causing the charging of the liquid therein and also causing the outflow of charged liquid therefrom, and when in another position closing the last two mentioned conduits.

In testimony that I claim the foregoing as my invention, I have hereunto signed my name this 16th day of May, A. D. 1922.

CHARLES A. GEDDES.